United States Patent [19]
Gampper et al.

[11] Patent Number: 6,003,082
[45] Date of Patent: Dec. 14, 1999

[54] SELECTIVE INTERNET REQUEST CACHING AND EXECUTION SYSTEM

[75] Inventors: James Michael Gampper; Daniel Charles Wolfe, both of Tucson, Ariz.

[73] Assignee: International Business Machines Corporation, Armonk, N.Y.

[21] Appl. No.: 09/064,992

[22] Filed: Apr. 22, 1998

[51] Int. Cl.[6] .................................................. G06F 13/00
[52] U.S. Cl. ........................... 709/225; 709/229; 709/102
[58] Field of Search ................................. 709/102, 103, 709/105, 107, 202, 203, 217, 219, 223, 224, 225, 226, 229, 300; 707/9, 10, 104, 200

[56] References Cited

U.S. PATENT DOCUMENTS

| | | | |
|---|---|---|---|
| 5,754,939 | 5/1998 | Herz et al. | 455/4.2 |
| 5,761,662 | 6/1998 | Dasan | 707/10 |
| 5,867,706 | 2/1999 | Martin et al. | 709/105 |
| 5,878,218 | 3/1999 | Maddalozzo et al. | 709/213 |
| 5,889,958 | 3/1999 | Willens | 709/229 |
| 5,894,554 | 4/1999 | Lowery et al. | 707/10 |

*Primary Examiner*—Viet D. Vu
*Attorney, Agent, or Firm*—Dan Hubert & Assoc.

[57] ABSTRACT

A server selectively filters and caches internet downloading requests from attached terminals, subsequently resubmitting cached requests appropriately. With the terminals connected to the internet via the server, the server is a focal point for all internet requests. Initially, the server receives a request from an attached terminal to download desired information from the internet. The received request contains a download code, such as a universal resource locator, identifying the desired information. The server determines whether the requested download should proceed based upon information obtained from one or more of sources such as (1) server-related limitations and status, (2) limitations set forth in a user profile, and (3) characteristics of the download itself, obtained from the download code and by tentatively forwarding the request to the internet and inspecting an initial response. The server applies certain criteria to these current conditions. If the criteria are satisfied, the server proceeds to receive the complete response from the internet and then forward the response to the requesting terminal. If the criteria are not satisfied, the current conditions are not appropriate for the user's particular request. In this case, the server caches the download code (if not already cached), sends a message to the internet to abort the request, determines when to resubmit the request in compliance with the criteria, and schedules resubmission of the download code to the internet at the determined time. If conditions warrant, the server may forego resubmission of the request.

52 Claims, 3 Drawing Sheets

SELECTIVE INTERNET REQUEST CACHING AND EXECUTION SYSTEM

BACKGROUND OF THE INVENTION

1. Field of the Invention

The present invention relates to the exchange of data over a network such as a public or private internet. More particularly, the invention concerns the operation of a server to selectively filter and cache internet access requests from the computers attached to the server, and subsequently resubmit the cached requests appropriately.

2. Description of the Related Art

Access to an "internet" is imperative for most computer users today. Public and private internets provide an especially convenient means for exchanging information. Internet users can quickly transmit data to others internet-connected sites, as well as research various subjects by downloading a variety of materials, such as text, graphics, and executable programs. Although the term "internet" is usually associated with the global and public Internet, there are both public and private internets. Private internets, often called "intranets" or "enterprise internets," often have access limited to employees of a particular company. One of the earliest and largest intranets, for example, is the network of the International Business Machines Corp.

An internet is an open interconnection of networks, supporting the exchange of information among various attached computers. An internet includes a network of routing computers, which receive access requests and cooperatively route the requests to appropriate host computers capable of executing the request. Advantageously, routing computers and hosts may use almost any different type of architecture and operating system. Within an internet, communications are typically conducted under a standard protocol, such as Transmission Control Protocol/Internet Protocol ("TCP/IP"). Internets may employ a variety of electronic transport media, such as telephone lines, optical fiber, satellite systems, local area networks, etc. Users can access internets by a number of different means. In one example, a user's computer connects to a host computer directly via telephone line, cable television line, ISDN line, or another line, the host computer itself being coupled to internet routers by a T3 connection or other suitably fast link. In another example, a user's computer may be coupled to a network, such as a local area network, which connects to an internet by an appropriate means, such as a T3 connection.

Although the depth of information available through internets is nearly unlimited, there are definitely limits to internet access speed. Even the fastest internet access links can only carry so much data in a given period of time. Due to the limited communications bandwidth of internet access links, internet users may confront a number of different penalties. For example, users with local network connection to an internet may experience slow download times because or the local network's internet workload from other users. In this case, since the network server operates as a conduit to the internet, it may be burdened by many different simultaneous user requests to download information from the internet. In a corporate intranet environment, users can suffer from slow network performance despite whether their particular download request is urgent or not. For example, one user with a particularly urgent request to download critical accounting information may be delayed because of many other users busy obtaining weather information, checking stock prices, idly "surfing the net," and doing other less urgent tasks.

Especially frustrating is the fact that burdensome internet access tasks can prevent the network server from efficiently completing other processing tasks, completely unrelated to internet access. For instance, a large number of concurrent internet communication requests may slow the network server's completion of spreadsheet programs, personal calendars, mathematical computations and modeling, and other programs running on the network on behalf of individual users.

On the other hand, users that individually connect to the internet can avoid many of the problems experienced with internet access through local networks. Nonetheless, users with individual internet connect on still encounter different problems of their own. If the user's internet link is a telephone line, for example, long downloads may result in higher charges from the telephone company, and longer periods during which a shared telephone line is unavailable for other purposes, such as voice calls and fax use. Consequently, known approaches to internet access are not completely adequate for some applications due to certain unsolved problems.

SUMMARY OF THE INVENTION

Broadly, the present invention concerns the use of a server to selectively filter and cache internet access requests from the terminals attached to the server, and subsequently resubmit the cached requests appropriately. The internet in this context may be the worldwide public Internet, or a private "enterprise" internet such as a corporate "intranet." Since the terminals are connected to the internet via the server, the server is a focal point for all internet requests. Initially, the server receives a request from one of the attached terminals to download desired information from the internet. The received request contains a download code, such as a universal resource locator ("URL"), identifying the desired information. The server determines whether the requested download should proceed based upon information obtained from one or more of sources such as (1) server-related limitations and status, (2) limitations set forth in a user profile, (3) the download code, and (4) characteristics of the download data itself obtained by tentatively forwarding the request to the internet and inspecting the initial response. The server applies certain predetermined criteria to current conditions represented by the foregoing data.

If the criteria are satisfied, the server proceeds to receive the complete response from the internet and then forwards the response to the requesting terminal. If the criteria are not satisfied, the current conditions are not appropriate for the user's particular request. In this case, the request is later resubmitted to the internet at an appropriate time. More specifically, if the criteria are not satisfied, the server caches the URL, sends a message to the internet to abort the request, determines when to resubmit the request in compliance with the criteria, and schedules resubmission of the URL to the internet at the determined time. Caching of the URL may be skipped if the URL has been previously cached, or if conditions warrant aborting the request completely. Notification may be sent to the user advising him/her of any delay and the status of the user's internet request.

Accordingly, in one embodiment, the invention may be implemented to provide a method to operate a server to selectively filter and cache internet access requests from the terminals attached to the server, and subsequently resubmit the cached requests appropriately. In another embodiment, the invention may be implemented to provide an apparatus, such as a server, programmed to selectively filter and cache internet access requests from the terminals attached to the server, and subsequently resubmit the cached requests appropriately. In still another embodiment, the invention may be implemented to provide a signal-bearing medium tangibly embodying a program of machine-readable instructions executable by a digital data processing apparatus to perform method steps for selectively filtering and caching internet access requests from terminals attached to the server, and subsequently resubmitting the cached requests at appropriate times.

The invention affords its users with a number of distinct advantages. For example, the invention conserves the computing and input/output resources of a shared server by selectively filtering users' internet download requests, caching filtered requests, and resubmitting cached requests appropriately. Computing and input/output resources may also be preserved by aborting a download request when conditions warrant. Second, the invention helps reduce a user's internet access costs by automatically scheduling download requests for an inexpensive access time. The invention also provides a useful benefit by conserving valuable communications bandwidth. The invention also provides a number of other advantages and benefits, which should be apparent from the following description of the invention.

DETAILED DESCRIPTION

The nature, objects, and advantages of the invention will become more apparent to those skilled in the art after considering the following detailed description in connection with the accompanying drawings. As mentioned above, the invention concerns the operation of a server to selectively filter and cache internet access requests from the computers attached to the server, and subsequently resubmit the cached requests appropriately.

Hardware Components & Interconnections
Gated Internet Access System

Figure 1:
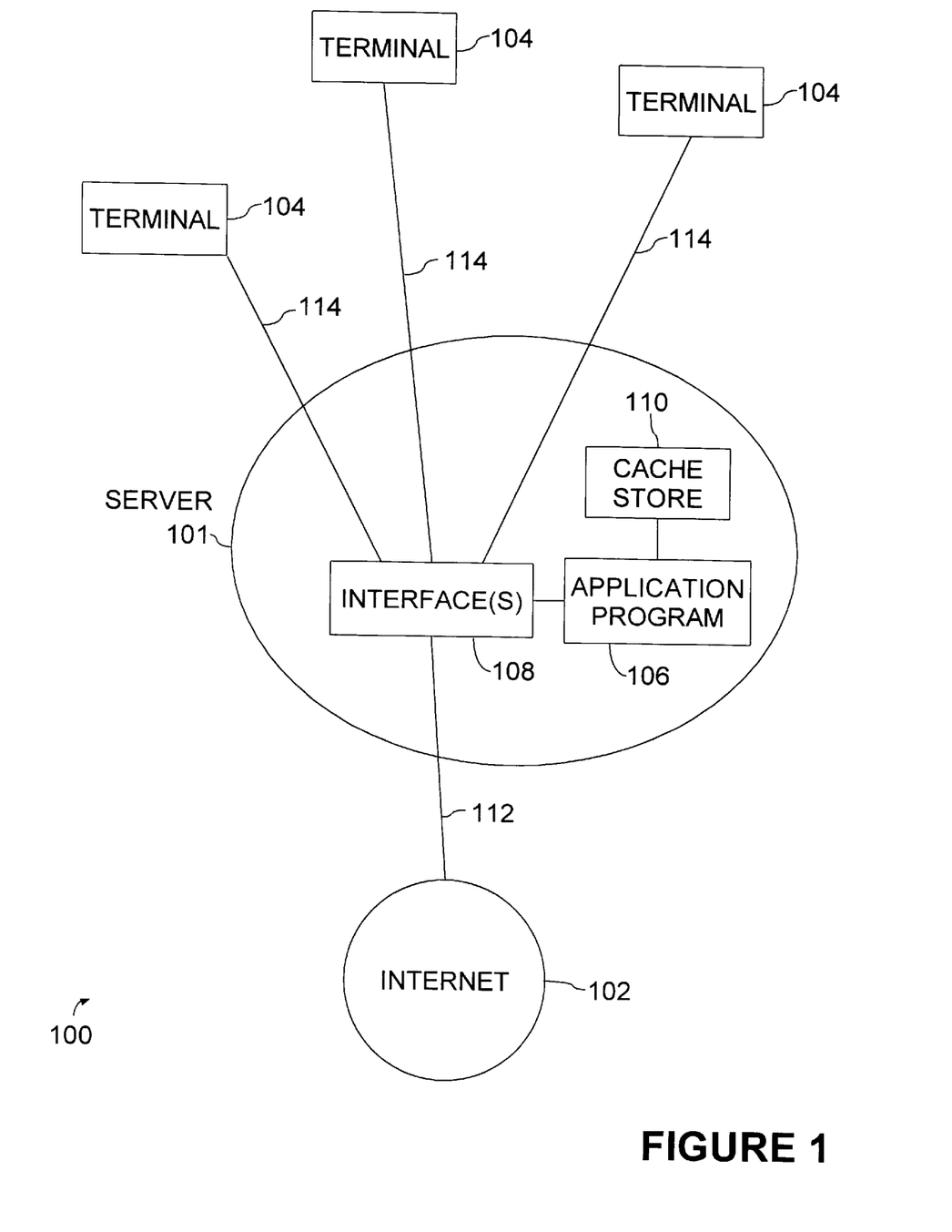
FIG. 1 is a block diagram of the hardware components and interconnections of a gated internet access system in accordance with the invention.

One aspect of the invention concerns a gated internet access system, which may be embodied by various hardware components and interconnections of the system 100 described in FIG. 1. The system 100 includes a download request server 101, an internet 102, and one or more terminals 104.

The internet 102 may comprise the "public" Internet, a private or "enterprise" internet such as a corporate intranet, or a combination of these. The server 101 and internet 102 are connected by a communications link 112, such as one or more telephone lines, wireless links, satellite, optical lines, cable television lines, a combination of the foregoing, or another suitable telecommunications link. The server 101 and terminals 104 are connected by suitable communications links such as those mentioned above in the context of the link 112. If the terminals 104 and server 101 are located in the same facility, some of all of the links 114 may comprise wires or cables. The terminals 104 may comprise personal computers, computer workstations, mainframe computers, user terminals without any substantial computing power such as "thin clients," or another device for users to submit requests to the internet 102 via the server 101. As a specific example, one or more of the terminals 104 may comprise IBM brand PS/2 personal computers.

The server 101 comprises a mainframe computer, computer workstation, personal computer, computer server, or another digital data processing machine of suitable computing power for the type and number of terminals 104. As a specific example, the server 101 may comprise an IBM brand AS/400 server. As the server 101 regulates internet access among the terminals 104, the server may also be called an "internet gate." The server 101 includes one or more interfaces 108, an application program 106, and a cache store 110. The server 101 also includes various other hardware and software components, which are not shown or discussed, since they are commonly implemented in computers and familiar to those of ordinary skill in the art.

The interface 108 comprises one or more telephone modems, T1 and/or T3 interfaces, cable modems, ISDN modems, or other suitable devices for exchanging signals with the internet 102 and specific embodiment of terminals 104 present. The application program 106 is a software module configured to implement the invention's selective internet request filtering and resubmission scheduling. The application program 106 may be implemented using one or more neural networks, artificial intelligence, lookup tables, if-then-else statements, or other appropriate techniques. The application program 106 is discussed in greater detail below. The cache store 110 comprises a data store, implemented in software, hardware, or a combination of both. As an example, the cache store 110 may comprise a software-implemented buffer, a fast-access memory hardware component such as random access memory, etc.

In an alternative embodiment, there may be terminals 104 separately coupled to the internet 102, rather than through the common server 101. In this embodiment, each of such "independent" terminal individually incorporates components of its own download request server, rather than employing the shared resources of the server 101. The components of an individual terminal's download request server may be implemented by programming existing hardware of the terminal 104, or by adding hardware components as necessary. In this environment, where terminals have separate internet access, there is no concern with overworking shared components such as a server. However, a need still exists to minimize internet access costs for each terminal 104. Internet access costs may include, for example, financial costs (e.g., per minute telephone line charges, per minute charges of an internet service provider, etc.) as well as non-monetary costs (e.g., convenience penalty for tying up an otherwise open telephone line, etc.). Thus, the internet gate provided by each terminal's local server component helps reduce internet access costs.

Exemplary Digital Data Processing Apparatus

Figure 2:
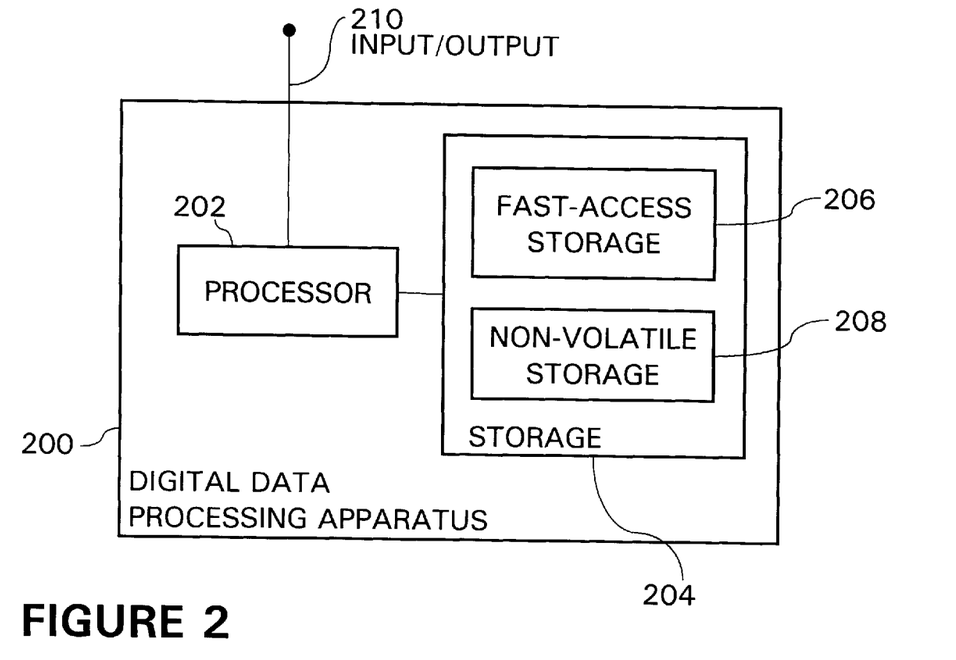
FIG. 2 is a block diagram of a digital data processing machine in accordance with the invention.

Another aspect of the invention concerns a digital data processing apparatus, configured to implement the server 101 as described herein. Such a digital data processing apparatus may be embodied by various hardware components and interconnections, one example being shown by the particular digital data processing apparatus 200 (FIG. 2).

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory, and may be used to store the programming instructions executed by the processor 202 during such execution. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Operation

In addition to the various hardware embodiments described above, a different aspect of the invention concerns a method for selectively filtering and caching internet access requests from the computers attached to the server, and subsequently resubmitting the cached requests appropriately.

Signal-Bearing Media

In the context of FIGS. 1–2, such a method may be implemented, for example, by operating the server 101 (FIG. 1), as embodied by a digital data processing apparatus 200 (FIG. 2), to execute certain machine-readable instructions. These instructions may reside in various types of signal-bearing media, and make up the application program 106. In this respect, one aspect of the present invention concerns a programmed product, comprising signal-bearing media tangibly embodying a program of machine-readable instructions executable by a digital data processor to perform a method to selectively filtering and caching internet access requests from the computers attached to the server, and subsequently resubmitting the cached requests appropriately.

Figure 3:
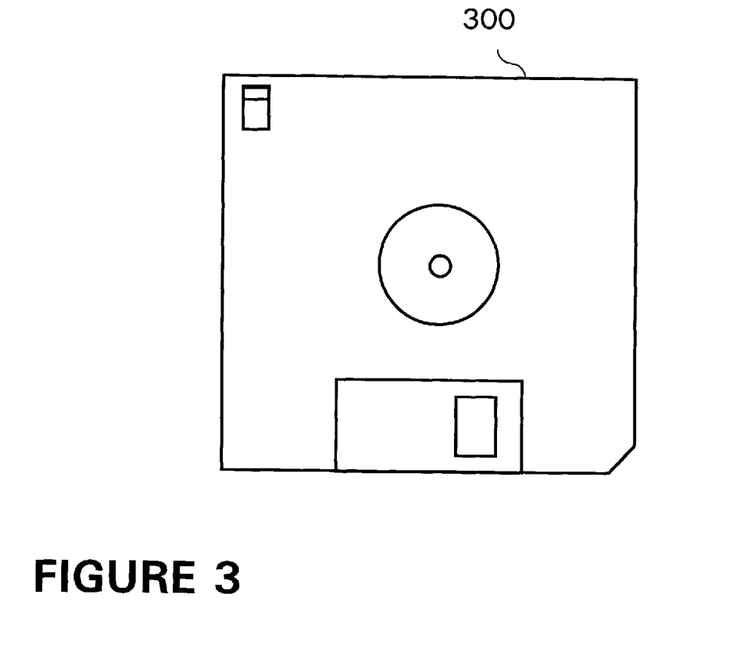
FIG. 3 shows an exemplary signal-bearing medium in accordance with the invention.

This signal-bearing media may comprise, for example, RAM (not shown) contained within the server 101, as represented by the fast-access storage 206 of the digital data processing apparatus 200. Alternatively, the instructions may be contained in another signal-bearing media, such as a magnetic data storage diskette 300 (FIG. 3), directly or indirectly accessible by the processor 202. Whether contained in the fast-access storage 206, diskette 300, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Overall Sequence of Operation

Introduction: Receiving Download Request

Figure 4:
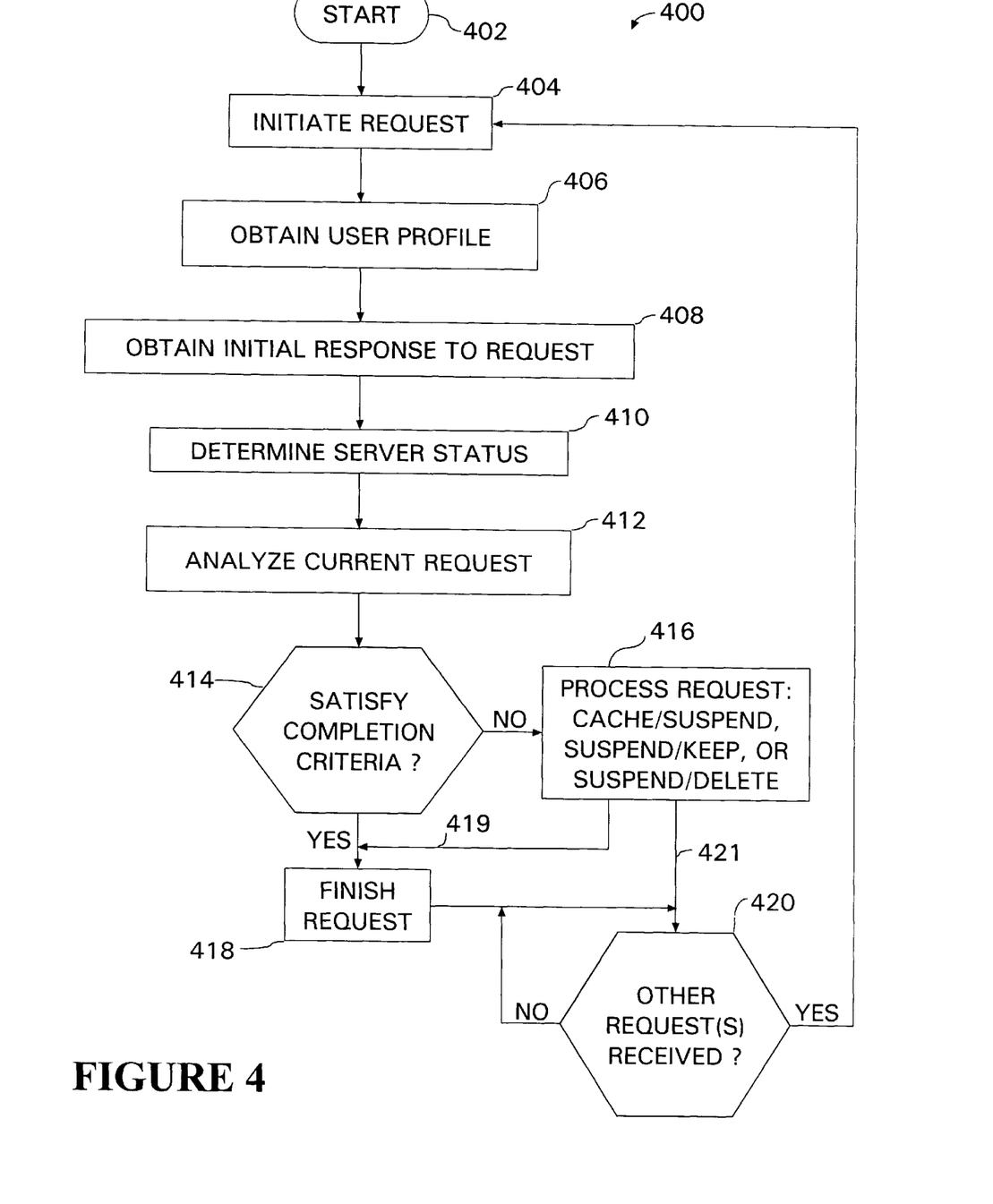
FIG. 4 is a flowchart of an operational sequence for operating a server to selectively filter and cache internet access requests from the computers attached to the server, and subsequently resubmit the cached requests appropriately, in accordance with the invention.

FIG. 4 shows a sequence of method steps 400 to illustrate one example of the method aspect of the present invention. For ease of explanation, but without any limitation intended thereby, the example of FIG. 4 is described in the context of the gated internet access system 100 described above. The steps 400 are initiated in step 402, when the server 101 receives an internet download request from one of the terminals 104, via the interface 108. This request is referred to as the "current" request. This request may be transmitted from terminal to server by various means. As a specific example, the terminal 104 may be executing an internet browser (such as NETSCAPE 3.0 or WINDOWS INTERNET EXPLORER 4.0), which transmits the internet request to the server 101. Alternatively, if an internet browser is running on the server 101, the terminal 104 may transmit its download request in another format to the server 101, for receipt and retransmission by the server's network-implemented browser. In addition to internet browsers, many other forms of request transmission will be apparent to ordinarily skilled artisans having the benefit of this disclosure, without departing from this invention. In the context of a terminal that is coupled to the internet 102 independent of a server 101, and therefore incorporates its own server 101, server-terminal communications may occur, for example, by one or more processors passing data from one application program to another.

The download request includes a "download code" identifying the desired material to download. As an example, the code may comprise a numeric, alphabetic, or alphanumeric code identifying the storage site of the download data, such as a universal resource locator ("URL"). An exemplary URL may comprise one of the following: (1) a file transfer protocol ("FTP") address, usually preceded by "ftp://", (2) worldwide web ("WWW") address, usually having the format "http:\\www . . . ", (3) gopher address, etc. The request may comprise a request to download a WWW page, a document, graphics item, table, or any other data object.

Following receipt of the request in step 402, the server 101 initiates the requested download in step 404. This is achieved by forwarding the request to the internet 102 over the link 112. As discussed below, the server 101 might (or might not) permit the request to complete, depending upon certain conditions. In response to submission of the internet request, the internet 102 begins to formulate its response (not shown).

Compiling Status Information

After step 404, the server's application program 106 compiles various data to ultimately determine whether the request should proceed. In the illustrated example, this data describes the status of the requesting user, the data to be downloaded, and the server 101 itself. This data is compiled from various sources, as discussed in detail below.

Status of Requesting User

Considering step 406 in detail, the application program 106 collects information about the requesting user by retrieving a "user profile." In one example, there is one user profile per-associated with each terminal 104. Alternatively, if more than one person share a terminal 104, each user profile may be associated with a particular person. The user profiles may be stored at the server 101, stored at the terminals 104 and transmitted to the server at an appropriate time, or stored elsewhere, depending upon the needs of the particular application.

In the illustrated embodiment, all user profiles contain the same data fields, which may be established by a person such as a system administrator. An exemplary user profile is shown in Table 1, below.

TABLE 1

User Profile

| USER NAME | PRIORITY LEVEL | PROHIBITED ACCESS TIMES | PROHIBITED DOWNLOADS | MAX DOWNLOAD |
|---|---|---|---|---|
| Jim | 50 | 07:00–17:000 | ANY DOWNLOAD CODE CONTAINING "XXX" | 10 Mb |

As shown in Table 1, one data field is "priority level," comprising a number representing the user's general priority among all users, as set by the system administrator. In the present example, this number is between zero and one hundred. A company president, for example, may be assigned a priority level of one hundred, higher than most other employees. Another data field is "prohibited access times." This field may outline times at which the user is prevented from internet downloads, times when downloads are least expensive, otherwise preferred times for internet downloading, etc. Another data field is "prohibited downloads," which outlines certain types of downloads for the identified user. Downloads be prohibited by source (e.g., ftp:\, http:\\, etc.), by characters in the URL (e.g., "xxx"), or a combination of these or different characteristics.

In the embodiment of the system 100 with independent terminals, the data fields may be adjusted from those shown in order to specify user preferences for inexpensive internet connect time, faster times of the day/week to download, etc.

In step 406, the server retrieves the user profile that corresponds to the requesting terminal 104 (and a specific user of that terminal, if there are multiple terminal users).

Status of Download Request

As mentioned above, the server 101 also collects various information about the requested download. As an example, this information includes the size of the download (e.g., 10 Mb), the type of data object (e.g., graphics, text, tables, etc.), and other information about the download. The server 101 obtains this information from the content of the download code and from the internet's response to the terminal request previously submitted in step 404. More particularly, in step 406 the server 101 receives an "initial part" of the internet response to the download request of step 404. As an example, this initial response comprises data, less than the entire response, including parameters such as a header or other such information indicating the size of the entire response, type of data object, etc.

An exemplary set of header information is shown in Table 2, below.

TABLE 2

Download Parameters

| OBJECT TYPE | OBJECT SIZE | DOWNLOAD SOURCE |
|---|---|---|
| executable binary code | 4.5 Mb | ftp:/ |

Status of Server

After step 408, the server 101 determines the server's status in step 410. In the illustrated embodiment, the server status includes the activity level of the server, as well as certain predefined downloading restrictions. Table 3 (below) shows an exemplary server status. The server status concerns information about current conditions at the server 101, whereas the downloading restrictions concern certain profile information specifying permissible conditions for the server 101 to carry out a particular download request.

The server status information includes information such as the server's busyness, known as "percent loading," where 0% loading indicates an idle server and 100% loading signifies a server working to its maximum capacity. In the present example, the percent loading includes an instantaneous figure as well as a running average over a fixed time period. The server status information of step 410 may also include various other information, such as the time of day. This information affects the server's ability to satisfy internet downloading requests. Excessive server loading delays the server's processing and input/output of work for all terminals. And, even though the server may be unoccupied at a particular time, high workload is still predictable at certain times of the day.

In contrast with the server activity level, the predefined downloading restrictions concern various profile information specifying permissible conditions for satisfying download requests. In the illustrated example, this data includes (1) a maximum permissible busyness (instantaneous and average), beyond which new download requests cannot be immediately satisfied, (2) other time-dependent limits on certain types and sizes of downloads, and (3) minimum required user priority for completing download requests (the server 101 may adjust this value depending upon its busyness, the priority of users with other pending download requests, and other factors).

TABLE 3

| | | | | | Server Status | |
|---|---|---|---|---|---|---|
| BUSYNESS (INSTANT) | BUSYNESS (AVG.) | TIME | MAX BUSYNESS (INSTANT) | MAX BUSYNESS (AVG.) | OTHER LIMITS | PRIORITY LIMIT |
| 50% loading | 65% loading | 12:15 Thurs. 4-9-98 | 80% | 45% | ♦ 09:00–10:00 Mondays, no ftp > 3 Mb<br>♦ 16:30–17:30 all days, no http > 10 Mb, no ftp > 60 Mb | MIN. 30 |

Without departing from the present invention, the data fields of Table 3 may be adjusted in different ways to accommodate terminals independently coupled to the internet 102, as will be recognized by those of ordinary skill in the art (having the benefit of this disclosure). For example, the consideration of priority may be omitted.

Evaluating Request and Status

After step 410, the server 101 performs step 412, by analyzing data that was compiled in steps 406–410. Generally, step 412 determines whether the current request should be completed or not, in view of the compiled characteristics of the user, server, and download request. The compiled information may be analyzed in different ways, as will be recognized by ordinarily skilled artisans having the benefit of this disclosure.

According to one approach, the compiled information may be evaluated first to determine whether any condition prevents the download request from completing. For instance, if the user's profile prohibits downloading during certain times, and the server shows the current "time of day" in this range, the request cannot complete. As another example, the user's download request is prevented if it seeks data of an impermissible size or type. Next, if none of these preventive conditions exist, the server's busyness and average priority of download requests are evaluated to determine whether the current request should proceed. For example, if the server's loading is high, the current request may be rejected in favor of ongoing requests with higher priority indices. Conversely, with low server loading, the current request may be accepted even if the average ongoing download request is higher than the requesting user's priority.

As an alternative to the illustrated embodiment, the analysis of step 412 may be performed in a staged sequence, rather than gathering all available information first and then analyzing it. In this embodiment, the server 101 may analyze easily available information first (such as the user profile with respect to time of day, etc.), and proceeding to more involved analysis only if conditions warrant. Thus, in this example, the download request of step 404 may be delayed until the server 101 verifies that other conditions precedent have been satisfied.

In any case, having conducted the necessary analysis in step 412, the server 101 completes the final portion of the analysis by determining whether the current conditions warrant completion of the download request or not (step 414).

Completing Request

If conditions dictate completion of the terminal's request, the request is permitted to complete, as shown by step 418. Completion of the request involves permitting the internet 102 to process the request originally submitted in step 404 (or submitting the request for the first time if step 404 was delayed pending staged analysis of other available information). More particularly, the requested data is downloaded and stored locally at the terminal 104 or server 101, and the server 101 notifies the user of the completion of the download request and resulting availability of this data.

Terminating Request

On the other hand, if current conditions do not warrant completion of the request, the request is processed in step 416. The request may be processed in different ways, depending upon the request, user, and system status. In the illustrated example, the following outcomes are provided:

1. CACHE/SUSPEND: The request may be suspended and cached for resubmission to the internet later. In this embodiment, the request (of step 404) is aborted by sending an appropriate message to the internet 102. Also in this step, the URL is stored in the cache store 110 in association with the requesting one of the terminals 104, and appropriate criteria is established for resubmitting the cached request. This criteria may specify certain conditions in the server 101, expiration of a wait timer, satisfaction of a predefined resubmit schedule, or other conditions for resubmitting the cached request. The server 101 may also send an advisory message to the requesting terminal 104, notifying the user of the delay. The cached request is resubmitted by proceeding along the path 419 to step 418.

2. SUSPEND/KEEP: If the URL has already been cached for the requesting terminal, the cache entry is permitted to remain. However, the current request is suspended by sending an appropriate abort message to the internet 202. The server also establishes appropriate criteria (e.g., wait timer expiration) for resubmitting the request. The server 101 may also send an advisory message to the requesting terminal 104, notifying the user of the delay. The cached request is ultimately resubmitted by proceeding along the path 419 to step 418.

3. SUSPEND/DELETE: If some condition, such as the user's profile, dictates that the download request never complete, the request is aborted without caching it.

Processing Future Requests

After step 418, or step 416 via path 421, the server 101 in step 420 asks whether any other internet downloading requests have been received from the terminals 104. Task 420 repeats until such a request is received, at which time the routine 400 returns to step 404, discussed above.

Exemplary Code Sequence

To illustrate the invention in even greater detail, Table 4 (below) depicts a sequence of pseudo-code that may be used to implement the application program 106.

TABLE 4

Exemplary Code Sequence

```
. . .
if user_url_request then call url_cache_main_routine
. . .
url_cache_main_routine
if user_object_request_size > admininstrator_set_object_size_for_user OR
user_object_request_type is not in the set of admininstrator_set_object_types OR
user_object_requested_url is not in the set of admininstrator_allowed_urls then
    call error;
    return
if actual_network_load >= admininstrator_set_network%load_level then
    set estimated_time_to_resubmit_request;
    call cache_url_routine;
    return
if user_object_request_size > admininstrator_set_object_size_for_time_of_day/date then
    set estimated_time_to_resubmit_request;
    call cache_url_routine;
    return
if user_object_request_size > admininstrator_set_object_size then
    set estimated_time_to_resubmit_request;
    call cache_url_routine;
    return
return
cache_url_routine (subroutine)
    store user_url_request; estimated_time_to_resubmit_request
    send user message_of_delayed_response
return
```

EXAMPLE

To further illustrate the operation of the invention, a more detailed example is provided using the sequence 400 (FIG. 4). In step 402, one of the terminals 104 submits an internet download request to the server 101 at 10:30 a.m. The download request is identified by a download code comprising the URL "http:\\www.ibm.com". In step 404, the server 101 initiates the request by forwarding the URL to the internet 102. In step 406, the server 101 obtains the user's profile, which is shown in Table 5, below.

404, and determines the following information about the requested download, as shown in Table 6.

TABLE 6

Download Parameters

| OBJECT TYPE | OBJECT SIZE | DOWNLOAD SOURCE |
|---|---|---|
| graphic object | 25 Mb | http:[\] |

TABLE 5

User Profile

| USER NAME | PRIORITY LEVEL | PROHIBITED ACCESS TIMES | PROHIBITED DOWNLOADS | MAX DOWNLOAD |
|---|---|---|---|---|
| John Smith | 30 | 07:00–09:00, 15:00–17:00 | DOWNLOAD CODES CONTAINING "XXX" | 30 Mb |

In step 408, the server 101 reviews the URL and receives an initial portion of the internet response to the request of step After step 408, the server 101 determines its own status in step 410. The resultant information is shown in Table 7, below.

TABLE 7

Server Status

| BUSYNESS (INSTANT) | BUSYNESS (AVG.) | TIME | MAX BUSYNESS (INSTANT) | MAX BUSYNESS (AVG.) | OTHER LIMITS | PRIORITY LIMIT |
|---|---|---|---|---|---|---|
| 50% loading | 65% loading | 10:30 Mon. 4-6-98 | 80% | 45% | ♦ 09:00–10:00 Mondays, no ftp > 3 Mb<br>♦ 09:00–11:00 Mondays, no http > | MIN. 25 |

TABLE 7-continued

| | | | Server Status | | | |
|---|---|---|---|---|---|---|
| BUSYNESS (INSTANT) | BUSYNESS (AVG.) | TIME | MAX BUSYNESS (INSTANT) | MAX BUSYNESS (AVG.) | OTHER LIMITS | PRIORITY LIMIT |
| | | | | | 20 Mb ◆ 16:30–17:30 all days, no http > 10 Mb, no ftp > 60 Mb | |

After step 410, the server analyzes the current conditions to determine whether the requested download should proceed. In this case, step 412 determines that the request is not prohibited because of the user's priority level (which exceeds the specified minimum of 25), restricted access times, download types, or maximum size of download. Nor is the request improper due to the server's instantaneous loading. Nonetheless, the request should be suspended and cached because the server's average loading is higher than permitted, and because the download size is an "http:\\" request larger than 20 Mb, which is prohibited during 09:00–11:00 on Mondays. Accordingly, step 414 routes control to step 416, which programs the server 101 to automatically resubmit the cached URL after a predefined wait period.

When step 416 determines that the wait period has passed, the server status is refreshed, and the request is again analyzed as previously done in step 412. Assuming that this occurs at 10:35, the request must be suspended and cached again, because the server still does not permit "http:\\" type requests exceeding 20 Mb at this time, and the current request is for 25 Mb. When the request is later evaluated after 11:05, it meets all applicable criteria, and is permitted to complete in step 418.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for operating a download request server to regulate information exchange between one or more terminals and an internet, the method comprising:
   from a first one of the terminals, the server receiving a request to download desired information from the internet to the first terminal, the request containing a download code identifying the desired information;
   the server determining server status including a level of activity of the server and predefined downloading restrictions of the server;
   the server retrieving a previously established user profile associated with the first terminal;
   the server applying predetermined criteria to the server status, user profile, and download code;
   if the criteria are satisfied, the server obtaining a complete response from the internet responsive to the download code and then forwarding the complete response to the first terminal; and
   if the criteria are not satisfied, the server determining a time to resubmit the request and scheduling resubmission of the download code to the internet at the determined time.

2. The method of claim 1, the method further comprising:
   responsive to receiving the request from the first terminal, the server transmitting the request to the internet; and
   the server receiving an initial subpart of the complete response from the internet;
   where the predetermined criteria is additionally applied to content of the initial response.

3. The method of claim 1, the download code being an internet-compatible universal resource locator identifying a source of the desired information.

4. The method of claim 1, the internet comprising a private internet.

5. The method of claim 1, the internet comprising the public Internet.

6. The method of claim 1, the user profile including one or more of the following items of data: (1) a predetermined priority of an associated user, and (2) a predetermined schedule of permissible access times for that user.

7. The method of claim 1, the obtaining of a complete response from the internet including submitting the request to the internet.

8. The method of claim 2, the initial response including at least one of the following:
   a type of data object to be downloaded pursuant to the request, and a size of the complete response.

9. The method of claim 1, the download code comprising at least one of the following items: a worldwide web address, a file transfer protocol address, and a gopher address.

10. The method of claim 2, where if the criteria are not satisfied, the server additionally sends a message to the internet to abort the request.

11. The method of claim 1, the method further comprising, if the criteria are not satisfied, caching the download code.

12. The method of claim 1, there being multiple terminals, the server being coupled between the internet and the multiple terminals.

13. The method of claim 1, there being one terminal, where the terminal includes a digital data processing apparatus and the server comprises a software program executed by the terminal.

14. The method of claim 1, the activity level including a rating of processing activity and input/output activity of the server.

15. The method of claim 1, where if the criteria are not satisfied, and additional conditions are met, the server aborts the determining of the time to resubmit the request and the scheduling of resubmission.

16. The method of claim 1, the method further comprising resubmitting the request to the internet at the determined time.

17. A signal-bearing medium tangibly embodying a program of machine-readable instructions executable by a digital processing apparatus to perform a method for operating a download request server to regulate information exchange between one or more terminals and an internet, the method comprising:

from a first one of the terminals, the server receiving a request to download desired information from the internet to the first terminal, the request containing a download code identifying the desired information;

the server determining server status including a level of activity of the server and predefined downloading restrictions of the server;

the server retrieving a previously established user profile associated with the first terminal;

the server applying predetermined criteria to the server status, user profile, and download code;

if the criteria are satisfied, the server obtaining a complete response from the internet responsive to the download code and then forwarding the complete response to the first terminal; and     if the criteria are not satisfied, the server determining a time to resubmit the request and scheduling resubmission of the download code to the internet at the determined time.

18. The medium of claim 17, the method further comprising:

responsive to receiving the request from the first terminal, the server transmitting the request to the internet; and     the server receiving an initial subpart of the complete response from the internet;

where the predetermined criteria is additionally applied to content of the initial response.

19. The medium of claim 17, the download code being an internet-compatible universal resource locator identifying a source of the desired information.

20. The medium of claim 17, the internet comprising a private internet.

21. The medium of claim 17, the internet comprising the public Internet.

22. The medium of claim 17, the user profile including one or more of the following items of data: (1) a predetermined priority of an associated user, and (2) a predetermined schedule of permissible access times for that user.

23. The medium of claim 17, the obtaining of a complete response from the internet including submitting of the request to the internet,     executing a predetermined routine on the server to determine loading of the server.

24. The medium of claim 18, the initial response including at least one of the following: a type of data object to be downloaded pursuant to the request, and a size of the complete response.

25. The medium of claim 17, the download code comprising at least one of the following items: a worldwide web address, a file transfer protocol address, and a gopher address.

26. The medium of claim 18, where if the criteria are not satisfied, the server additionally sends a message to the internet to abort the request.

27. The medium of claim 17, the method further comprising, if the criteria are not satisfied, caching the download code.

28. The medium of claim 17, there being multiple terminals, the server being coupled between the internet and the multiple terminals.

29. The medium of claim 17, there being one terminal, where the terminal includes a digital data processing apparatus and the server comprises a software program executed by the terminal.

30. The medium of claim 17, the activity level including a rating of processing activity and input/output activity of the server.

31. The medium of claim 17, where if the criteria are not satisfied, and additional conditions are met, the server aborts the determining of the time to resubmit the request and the scheduling of resubmission.

32. The medium of claim 17, the method further comprising resubmitting the request to the internet at the determined time.

33. A computer-driven internet server system, comprising:

one or more terminals; and a download request server coupled to the terminals and including a digital data processing apparatus programmed to perform a method for regulating information exchange between the terminals and an internet coupled to the server, the method comprising:

from a first one of the terminals, the server receiving a request to download desired information from the internet to the first terminal, the request containing a download code identifying the desired information;

the server determining server status including a level of activity of the server and predefined downloading restrictions of the server;

the server retrieving a previously established user profile associated with the first terminal;

the server applying predetermined criteria to the server status, user profile, and download code;

if the criteria are satisfied, the server obtaining a complete response from the internet responsive to the download code and then forwarding the complete response to the first terminal; and         if the criteria are not satisfied, the server determining a time to resubmit the request and scheduling resubmission of the download code to the internet at the determined time.

34. The system of claim 33, the method further comprising:

responsive to receiving the request from the first terminal, the server transmitting the request to the internet; and     the server receiving an initial subpart of the complete response from the internet;

where the predetermined criteria is additionally applied to content of the initial response.

35. The system of claim 33, the download code being an internet-compatible universal resource locator identifying a source of the desired information.

36. The system of claim 33, triers being multiple terminals.

37. The system of claim 33, the terminals including computers.

38. The system of claim 33, the server comprising a digital data processing apparatus including a processor separate from the terminals.

39. The system of claim 33, the internet comprising a private internet.

40. The system of claim 33, the internet comprising the public Internet.

41. The system of claim 33, the user profile including one or more of the following items of data: (1) a predetermined priority of an associated user, and (2) a predetermined schedule of permissible access times for that user.

42. The system of claim 33, the obtaining of a complete response from the internet including submitting the response to the internet.

43. The system of claim 34, the initial response including at least one of the following: a type of data object to be downloaded pursuant to the request, and a size of the complete response.

44. The system of claim 33, the download code comprising at least one of the following items: a worldwide web address, a file transfer protocol address, and a gopher address.

45. The system of claim 34, where if the criteria are not satisfied, the server additionally sends a message to the internet to abort the request.

46. The system of claim 33, the method further comprising, if the criteria are not satisfied, caching the download code.

47. The system of claim 33, there being multiple terminals, the server being coupled between the internet and the multiple terminals.

48. The system of claim 33, there being one terminal, where the terminal includes a digital data processing apparatus and the server comprises a software program executed by the terminal.

49. The system of claim 33, the activity level including a rating of processing activity and input/output activity of the server.

50. The system of claim 33, where if the criteria are not satisfied, and additional conditions are met, the server aborts the determining of the time to resubmit the request and the scheduling of resubmission.

51. The system of claim 33, the method further comprising resubmitting the request to the internet at the determined time.

52. A computer-driven internet server system, comprising:

one or more first means for receiving internet download requests;

second means for exchanging digital signals; and third means, coupled to the first means via the second means, for regulating information exchange between the first means and an internet coupled to the third means, by:

from the first means, receiving a request to download desired information from the internet to the first means, the request containing a download code identifying the desired information;

determining a third means status including a level of activity of the third means and predefined downloading restrictions of the third means;

retrieving a previously established user profile associated the first means;

applying predetermined criteria to the third means status, user profile, and download code;

if the criteria are satisfied, obtaining a complete response from the internet responsive to the download code and then forwarding the complete response to the first means; and if the criteria are not satisfied, determining a time to resubmit the request and scheduling resubmission of the download code to the internet at the determined time.

* * * * *

UNITED STATES PATENT AND TRADEMARK OFFICE
CERTIFICATE OF CORRECTION

PATENT NO. : 6,003,082
DATED      : 12-14-1999
INVENTOR(S) : Gampper et al.

It is certified that error appears in the above-identified patent and that said Letters Patent is hereby corrected as shown below:

Title page item [57],
Abstract, line 11, change "more of sources" to - -more sources- -.

Column 15, line 48, claim 23, change "internet," to - -internet.- -

Column 15, lines 49-50, claim 23, delete "executing a predetermined routine on the server to determine loading of the server."

Column 16, line 53, claim 36, change "triers" to - -there- -.

Column 18, lines 20-21, claim 52, change "associated the" to - -associated with the- -.

Signed and Sealed this

Seventeenth Day of October, 2000

Attest:

Q. TODD DICKINSON

*Attesting Officer*  *Director of Patents and Trademarks*